(12) United States Patent
Kokubun et al.

(10) Patent No.: US 11,401,973 B2
(45) Date of Patent: Aug. 2, 2022

(54) THRUST ROLLER BEARING

(71) Applicant: JTEKT CORPORATION, Osaka (JP)

(72) Inventors: Keisuke Kokubun, Utsunomiya (JP);
Yoshihito Nakashima, Kariya (JP);
Taizou Wakayama, Kashiwara (JP);
Shingo Watanabe, Utsunomiya (JP)

(73) Assignee: JTEKT CORPORATION, Kariya (JP)

( * ) Notice: Subject to any disclaimer, the term of this patent is extended or adjusted under 35 U.S.C. 154(b) by 103 days.

(21) Appl. No.: 16/952,237

(22) Filed: Nov. 19, 2020

(65) Prior Publication Data

US 2021/0156420 A1 May 27, 2021

(30) Foreign Application Priority Data

Nov. 21, 2019 (JP) .............................. JP2019-210752
Nov. 21, 2019 (JP) .............................. JP2019-210753

(51) Int. Cl.
*F16C 33/62* (2006.01)
*F16C 33/58* (2006.01)
*F16C 19/30* (2006.01)
*F16C 33/34* (2006.01)

(52) U.S. Cl.
CPC .............. *F16C 33/585* (2013.01); *F16C 19/30* (2013.01); *F16C 33/34* (2013.01); *F16C 33/62* (2013.01); *F16C 2202/04* (2013.01); *F16C 2204/66* (2013.01); *F16C 2204/70* (2013.01); *F16C 2240/54* (2013.01)

(58) Field of Classification Search
CPC .......... F16C 19/10; F16C 19/12; F16C 19/30; F16C 19/305; F16C 19/32; F16C 33/34; F16C 33/58; F16C 33/583; F16C 33/585; F16C 33/588; F16C 33/62; F16C 33/64; F16C 35/067; F16C 2202/04; F16C 2204/62; F16C 2204/66; F16C 2204/70; F16C 2240/18; F16C 2240/54
See application file for complete search history.

(56) References Cited

U.S. PATENT DOCUMENTS

2016/0230809 A1* 8/2016 Roffe ..................... F16C 33/588
2020/0018348 A1* 1/2020 Ribeiro ................... F16C 19/30

FOREIGN PATENT DOCUMENTS

JP          2003-239981 A    8/2003
WO    WO-2022015791 A1 *  1/2022

* cited by examiner

*Primary Examiner* — Alan B Waits
(74) *Attorney, Agent, or Firm* — Oliff PLC (57) ABSTRACT

A thrust roller bearing includes a plurality of radially arranged rollers, and a pair of annular washers having raceway surfaces on which the rollers roll. The raceway surfaces are arranged to face each other. The roller is made of high-carbon chromium bearing steel and has a surface roughness of 0.01 to 0.10 in terms of Rvk and 0.01 to 0.08 in terms of Rk. At least one of the washers is made of carbon steel, surface compressive residual stress of the raceway surface is −1400 MPa to −1000 MPa, and Vickers hardness of surface of the raceway surface is 850 to 900.

5 Claims, 8 Drawing Sheets

THRUST ROLLER BEARING

CROSS-REFERENCE TO RELATED APPLICATION

This application claims priority to Japanese Patent Application No. 2019-210753 filed on Nov. 21, 2019 and Japanese Patent Application No. 2019-210752 filed on Nov. 21, 2019, each incorporated herein by reference in its entirety.

BACKGROUND

1. Technical Field

The present disclosure relates to a thrust roller bearing.

2. Description of Related Art

A thrust roller bearing including a plurality of radially arranged rollers and a pair of annular washers having raceway surfaces on which the rollers roll is known (for example, refer to Japanese Unexamined Patent Application Publication No. 2003-239981 (JP 2003-239981 A)). The thrust roller bearing is, for example, inserted between a non-rotating member and a rotating member in a transmission of a vehicle, and is used to smooth a rotation of the rotating member while receiving a thrust force in a bearing axis direction.

SUMMARY

In the thrust roller bearing, wear tends to increase in a poor lubrication environment where an amount of oil in lubricating oil is small. In recent years, an amount of lubricating oil supplied to a transmission of a vehicle or the like has tended to decrease and a thrust roller bearing having a high wear resistance that can suppress wear even in the poor lubrication environment is desired.

The present disclosure provides a thrust roller bearing having an improved wear resistance.

An aspect of the present disclosure relates to a thrust roller bearing. The thrust roller bearing includes a plurality of radially arranged rollers, and a pair of annular washers having raceway surfaces on which the rollers roll. The raceway surfaces are arranged to face each other. The roller is made of high-carbon chromium bearing steel and has a surface roughness of 0.01 to 0.10 in terms of Rvk and 0.01 to 0.08 in terms of Rk. At least one of the washers is made of carbon steel, surface compressive residual stress of the raceway surface is −1400 MPa to −1000 MPa, and Vickers hardness of surface of the raceway surface is 850 to 900.

According to the aspect, a wear resistance can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the present disclosure will be described with reference to FIGS. 1 to 7. Note that, the embodiment described below is shown as a preferred specific example for implementing the present disclosure. Although some technically preferable technical matters are specifically illustrated, the technical scope of the present disclosure is not limited to the specific embodiment.

Figure 1:
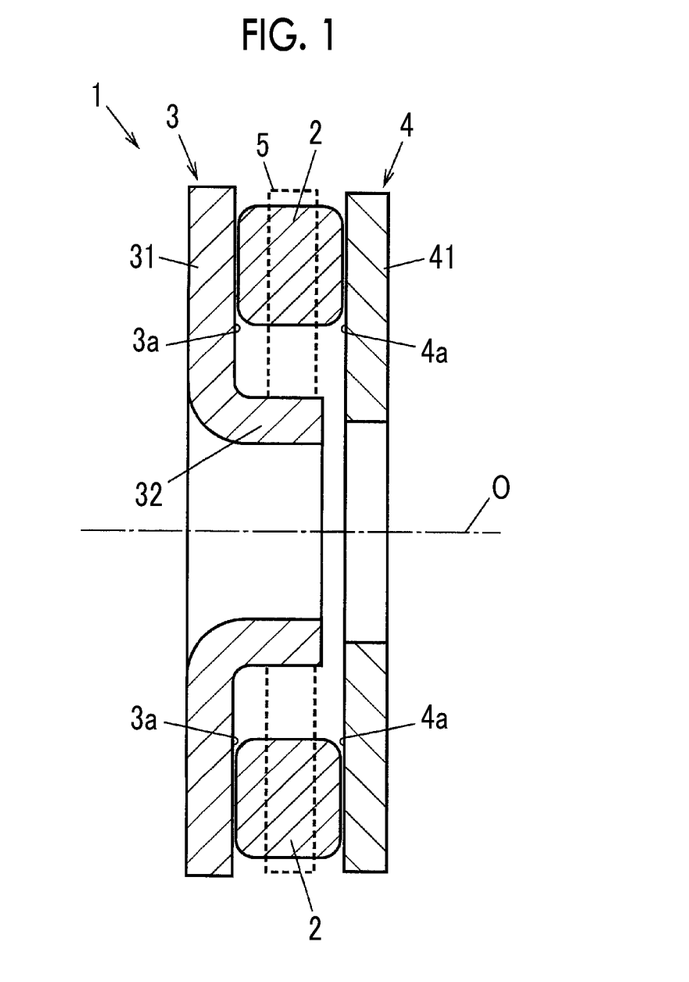
FIG. 1 is a cross-sectional view showing a cross section including a bearing axis of a thrust roller bearing according to an embodiment of the present disclosure.

FIG. 1 is a cross-sectional view showing a cross section including a bearing axis of a thrust roller bearing according to the present embodiment. A thrust roller bearing 1 includes a plurality of radially arranged rollers 2, an annular first washer 3 having a first raceway surface 3a on which the rollers 2 roll, and an annular second washer 4 having a second raceway surface 4a on which the rollers 2 roll. The first and second washers 3, 4 are arranged, such that the first and second raceway surfaces 3a, 4a face each other in an axial direction of a bearing axis-O. In the thrust roller bearing, the first washer 3 and the second washer 4 relatively rotate around the bearing axis-O.

The thrust roller bearing 1 is a bearing that is, for example, inserted between a rotating member and a non-rotating member in a transmission of a vehicle or an industrial machine, and that is used to smooth a rotation of the rotating member while receiving a thrust force in the axial direction by rolling the rollers 2.

The rollers 2 are rollably held by annular cages 5 shown by broken lines in FIG. 1. The rollers 2 revolve around the bearing axis-O by being held by the cages 5 while rotating with the relative rotation between the first washer 3 and the second washer 4. The first washer 3 integrally has a circular flat plate-shaped raceway portion 31 perpendicular to the axial direction, and a short cylindrical rib 32 extending from a radially inner end of the raceway portion 31 to a first side in the axial direction (the right side in FIG. 1, the second washer 4 side). A surface of the raceway portion 31 on the first side in the axial direction is the first raceway surface 3a. The second washer 4 has a circular flat plate-shaped raceway portion 41 perpendicular to the axial direction. A surface of the raceway portion 41 on a second side in the axial direction (the left side in FIG. 1, the first washer 3 side) is the second raceway surface 4a. In the present embodiment, the first washer 3 is provided on the rotating member, and the second washer 4 is provided on the non-rotating member.

The shapes of the first and second washers 3, 4 are not limited to those illustrated. For example, the rib 32 of the first washer 3 may be omitted, or the second washer 4 may have a short cylindrical rib extending from a radially outer end of the raceway portion 41 to the second side in the axial direction.

As the roller 2, a roller made of high-carbon chromium bearing steel having a high wear resistance may be used. In the present embodiment, the roller 2 in which a special heat treatment is performed on high-carbon chromium bearing steel to further improve a surface hardness is used. More specifically, the roller 2 contains 0.1 mass % to 0.6 mass % of carbon and 1.1 mass % to 1.6 mass % of nitrogen in a range of 0.1 mm from a surface. In the present embodiment, a surface compressive residual stress of the roller 2 is −1200 MPa or larger and smaller than −900 MPa, and a Vickers hardness of the surface of the roller 2 is 700 to 850. It may be thought that the surface hardness of the roller 2 is further improved by performing shot peening on the roller 2, but as will be described later, it has been confirmed that a wear resistance of the thrust roller bearing 1 is reduced when the shot peening is performed on the roller 2. Therefore, it is not preferable to perform the shot peening on the roller 2. As the first and second washers 3, 4, washers made of carbon steel having a relatively high hardness and a high wear resistance are used.

Figure 2:
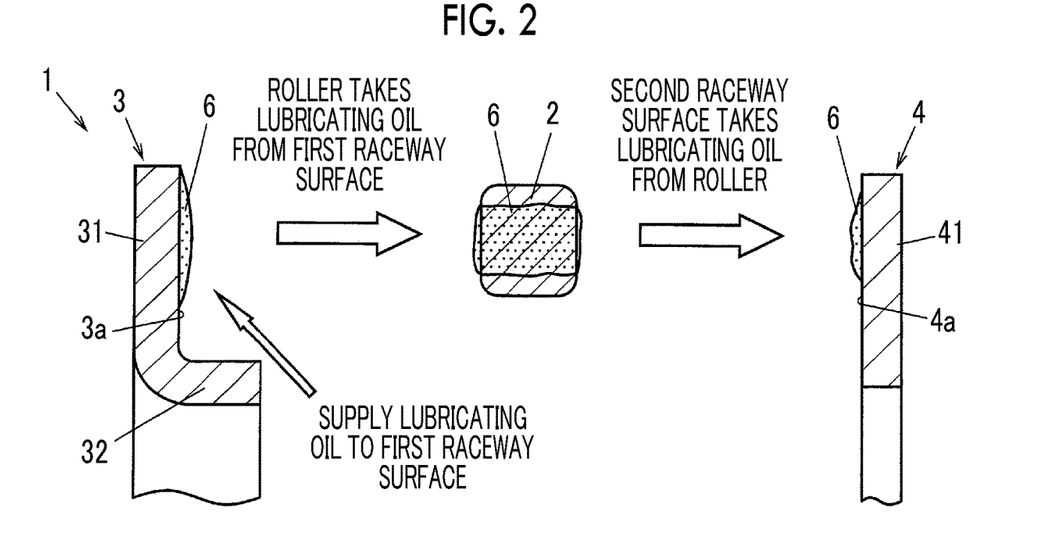
FIG. 2 is a diagram illustrating movement of lubricating oil in a poor lubrication environment.

As shown in FIG. 2, in a poor lubrication environment in which an amount of lubricating oil 6 is small, the lubricating oil 6 moves between the first and second raceway surfaces 3a, 4a via the roller 2. For example, the lubricating oil 6 supplied to the first raceway surface 3a moves to the surface of the roller 2 by rotation of the roller 2 and is further supplied to the second raceway surface 4a from the surface of the roller 2.

At this time, when the surface of the roller 2 is rough, the lubricating oil 6 is held too much on the surface of the roller 2, such that the lubricating oil 6 is less likely to be supplied to the raceway surfaces 3a, 4a. Therefore, it is desirable to make the surface of the roller 2 as smooth as possible and prevent the roller 2 from holding the lubricating oil 6 too much. In addition, it is desirable to make the raceway surfaces 3a, 4a hard, such that the raceway surfaces 3a, 4a are not worn even when the amount of the lubricating oil 6 is small. Therefore, in the present embodiment, the wear resistance is improved by making the surface of the roller 2 smooth and performing the shot peening on the washers 3, 4 to increase hardnesses of surfaces of the raceway surfaces 3a, 4a.

Specifically, in the present embodiment, a surface roughness of the roller 2 is set to 0.01 to 0.10 in terms of Rvk and 0.01 to 0.08 in terms of Rk. Further, in the present embodiment, by performing the shot peening on the washers 3, 4, surface compressive residual stresses of the raceway surfaces 3a, 4a are set to −1400 MPa to −1000 MPa, and Vickers hardnesses of the surfaces of the raceway surfaces 3a, 4a are set to 850 to 900. As in the present embodiment, it is desirable that surface residual stresses and the hardnesses of both of the raceway surfaces 3a, 4a of the first and second washers 3, 4 are set to be within the numerical range. However, the effect of improving the wear resistance as compared with the conventional case can be obtained by setting the surface residual stress and the hardness of at least one of the raceway surfaces 3a, 4a of the first and second washers 3, 4 to be within the numerical range. Particularly, in the first washer 3 that rotates with a rotation of the rotating member, the lubricating oil 6 is likely to be scattered due to centrifugal force, and poor lubrication is likely to occur. Therefore, it is desirable to set the surface residual stress and the hardness of at least the first raceway surface 3a of the first washer 3 to be within the numerical range.

Further, in order to suppress the scattering of the lubricating oil 6 due to the centrifugal force, it is more desirable to make it easier for the lubricating oil 6 to be held on the first raceway surface 3a by making a surface roughness of the first raceway surface 3a of the first washer 3 relatively rough. Note that, the surface roughness of the first raceway surface 3a is made too rough, the lubricating oil 6 is difficult to move to the roller 2 or the second raceway surface 4a, and the wear resistance may be reduced. Therefore, it is desirable that the surface roughness of the first raceway surface 3a is adjusted to an appropriate roughness, such that the lubricating oil 6 can be held appropriately. In the present embodiment, the surface roughness of the first raceway surface 3a is set to 0.05 to 0.22 in terms of Rvk and 0.05 to 0.15 in terms of Rk. In the present embodiment, surface roughnesses of both of the first and second raceway surfaces 3a, 4a are set to 0.05 to 0.22 in terms of Rvk and 0.05 to 0.15 in terms of Rk. The surface roughness of the roller 2 or the surface roughnesses of the raceway surfaces 3a, 4a can be appropriately adjusted with a polishing condition in a polishing process such as barrel polishing. Further, the surface compressive residual stresses and the Vickers hardnesses of the surfaces of the raceway surfaces 3a, 4a can be appropriately adjusted with a shot peening condition.

Figure 3:
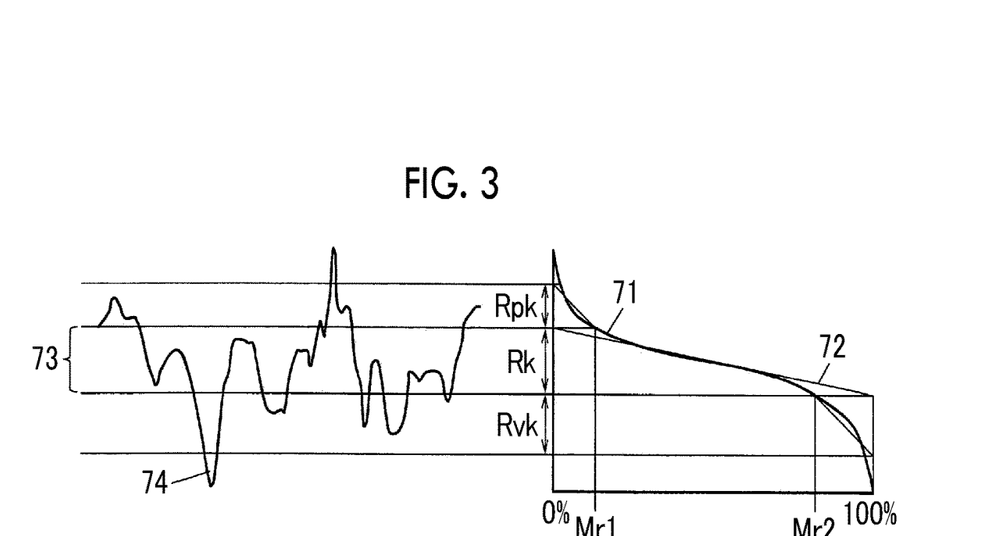
FIG. 3 is a graph illustrating Rvk and Rk that are parameters representing a surface roughness.

Here, Rvk and Rk representing the surface roughness are lubricity evaluation parameters (load curve parameters) of a plateau structure surface. As shown in FIG. 3, an area between height positions where an equivalent straight line 72 that is the gentlest slope of the central portion of a load curve 71 of surface irregularity intersects load length ratios of 0% and 100% is defined as a core portion 73. The height of the core portion 73 (level difference between top and bottom) is Rk. Rvk represents the depth of a projecting valley portion 74.

Evaluation of Wear Resistance

The thrust roller bearing 1 according to the present embodiment was manufactured as a prototype and used in Example and the wear resistance was evaluated. The thrust roller bearing 1 according to Example was manufactured as follows. A bar line of JIS SUJ2 was cut to obtain a workpiece of the roller of Example. The workpiece of the roller of Example was carbonitrided by being held for one hour at a temperature of 820° C. to 870° C. in an atmosphere with a carbon potential of 1.2 to 1.6 and an ammonia concentration of 0.1 vol % to 0.5 vol %. Then, the workpiece of the roller was immersed, rapid-cooled, and quenched in oil at 80° C. After quenching, the workpiece of the roller was tempered for one hour at 200° C. Then, the polishing was performed, and the barrel polishing was performed for two hours. As a result, the roller 2 of Example was obtained. In a range of 0.1 mm from the surface of the roller 2 of Example, 1.1 mass % to 1.6 mass % of carbon and 0.1 mass % to 0.6 mass % of nitrogen were contained. SAE1075 steel plate was annularly punched out and forged to produce a workpiece of the first washer of Example and a workpiece of the second washer of Example. The workpiece of the first washer of Example and the workpiece of the second washer of Example were held for 0.5 hours at a temperature of 760° C. to 830° C. and were immersed, rapid-cooled, and quenched in oil at 80° C. After quenching, the workpieces were tempered for one hour at 200° C. Then, the shot peening was performed, the polishing was performed, and the barrel polishing was performed for five hours. As a result, the first washer 3 of Example and the second washer 4 of Example were obtained. The shot peening conditions were as follows.

Shot particle diameter: 100 μm or smaller
Shot particle material: Iron
Shot pressure: 0.5 MPa SPCD steel plate was punched out annularly to remove a portion that was to be a pocket. Thereby, the cage 5 was obtained. The thrust roller bearing 1 was manufactured by combining the roller 2 of Example, the first washer 3 of Example, the second washer 4 of Example, and the cage 5. As a result, the thrust roller bearing 1 of Example was obtained.

Figure 4A:
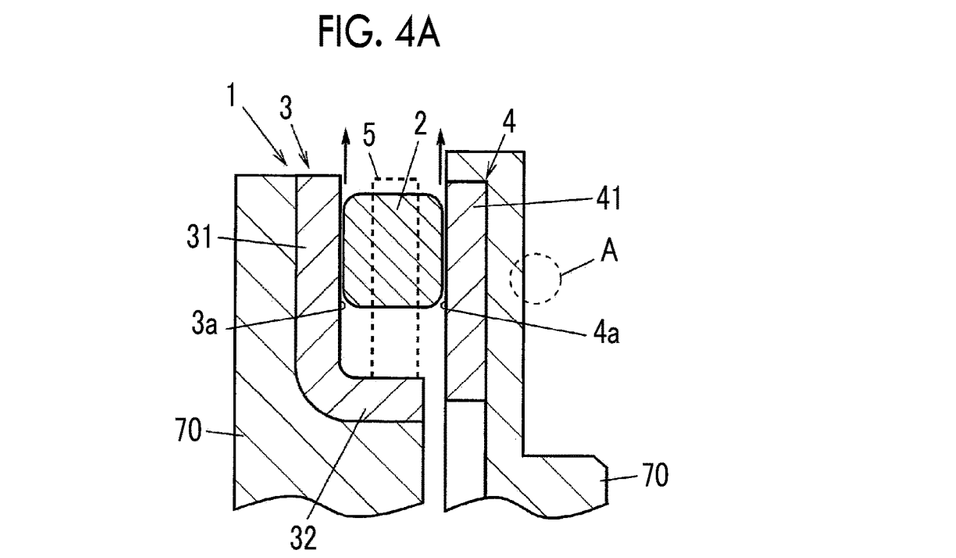
FIG. 4A is a diagram illustrating a temperature measurement position in a test for evaluating a wear resistance.

A test was performed by attaching the first and second washers 3, 4 to jigs 70 as shown in FIG. 4A, and dropping 0.05 g of the lubricating oil 6 on the first raceway surface 3a at an axial load of 9 kN and a rotation speed of 2000 rpm. In the test, a temperature of an area represented by A in FIG. 4A, that is, a temperature of a back surface of the jig 70 holding the second washer 4 was measured, and the test was terminated when the temperature rose to 80 degrees.

Figure 4B:
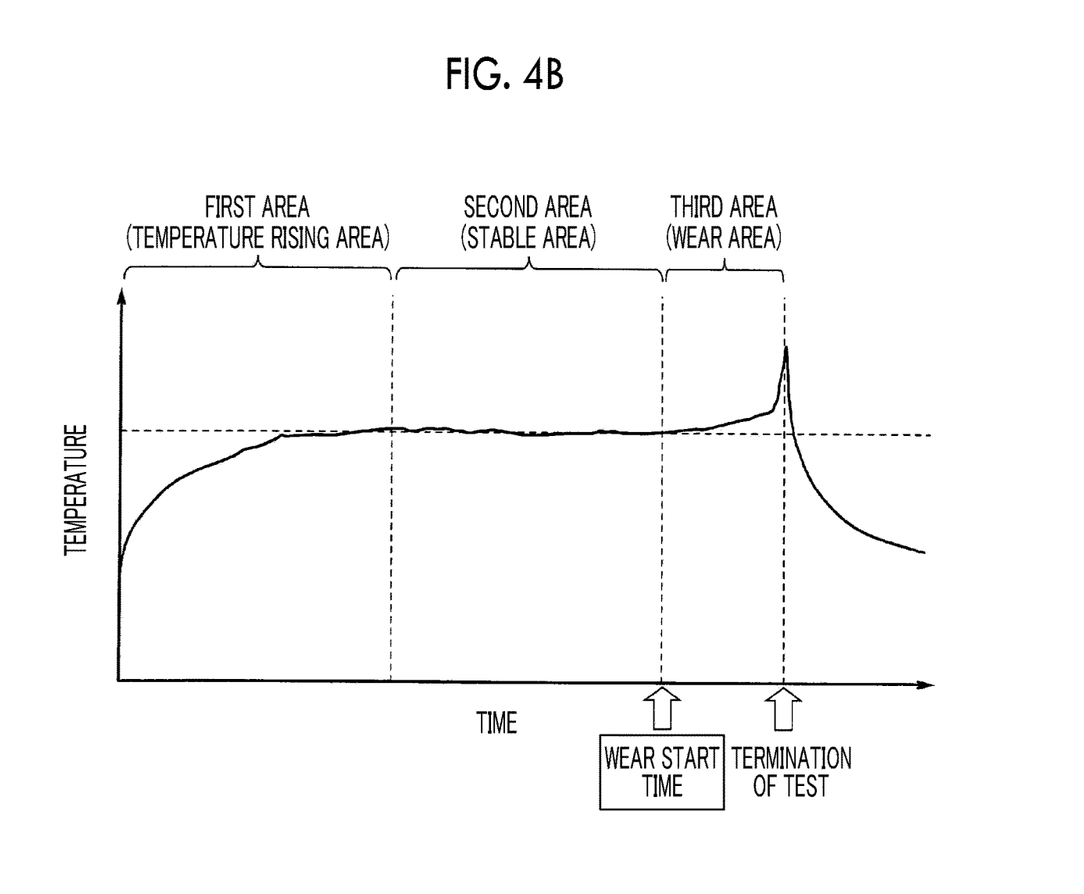
FIG. 4B is a graph illustrating a wear start time in the test for evaluating the wear resistance.

FIG. 4B shows a change with time of the temperature measured in the test. As shown in FIG. 4B, the change with time of the temperature can be divided into a first area where the temperature gradually rises after start of the test, a second area where the temperature is substantially constant and stable, and a third area where wear occurs and the temperature rises. A start time of the third area is defined as a wear start time. In the present embodiment, the wear resistance was evaluated based on the wear start time. The number of tests was three times.

Further, for comparison with Example, a thrust roller bearing of Conventional Example in which the roller 2 made of a quenched and tempered material of high-carbon chromium bearing steel was used and the adjustment of the surface roughness of the roller 2 or the surface roughnesses of the raceway surfaces 3a, 4a or the shot peening was not performed was prepared. The evaluation of the wear resistance was performed in the same manner as in Example.

The thrust roller bearing 1 according to Conventional Example was manufactured as follows. A bar line of JIS SUJ2 was cut to obtain a workpiece of the roller of Conventional Example. The workpiece of the roller of Conventional Example was held for 0.5 hours at a temperature of 820° C. to 850° C. and was immersed, rapid-cooled, and quenched in oil at 80° C. After quenching, the workpiece of the roller was tempered for one hour at 200° C. Then, the polishing was performed, and the barrel polishing was performed for one hour. As a result, the roller 2 of Conventional Example was obtained. SAE1075 steel plate was annularly punched out and forged to produce a workpiece of the first washer of Conventional Example and a workpiece of the second washer of Conventional Example. The workpiece of the first washer of Conventional Example and the workpiece of the second washer of Conventional Example were held for 0.5 hours at a temperature of 760° C. to 830° C. and were immersed, rapid-cooled, and quenched in oil at 80° C. After quenching, the workpieces were tempered for one hour at 200° C. Then, the polishing was performed, and the barrel polishing was performed for one hour. As a result, the first washer 3 of Conventional Example and the second washer 4 of Conventional Example were obtained. SPCD steel plate was punched out annularly to remove a portion that was to be a pocket. Thereby, the cage 5 was obtained. The thrust roller bearing 1 was manufactured by combining the roller 2 of Conventional Example, the first washer 3 of Conventional Example, the second washer 4 of Conventional Example, and the cage 5. As a result, the thrust roller bearing 1 of Conventional Example was obtained.

Further, a thrust roller bearing of Comparative Example 1 in which the same roller 2 as in Example was used, solely the adjustment of the surface roughnesses of the raceway surfaces 3a, 4a was performed and the shot peening was not performed was prepared. A thrust roller bearing of Comparative Example 2 in which the roller 2 using high-carbon chromium bearing steel with shot peening was used and the same washers 3, 4 as in Example were used was prepared. The evaluation of the wear resistance was performed in the same manner as in Example.

The thrust roller bearing 1 according to Comparative Example 1 was manufactured as follows. A bar line of JIS SUJ2 was cut to obtain a workpiece of the roller of Comparative Example 1. The workpiece of the roller of Comparative Example 1 was carbonitrided by being held for one hour at a temperature of 820° C. to 870° C. in an atmosphere with a carbon potential of 1.2 to 1.6 and an ammonia concentration of 0.1 vol % to 0.5 vol %. Then, the workpiece of the roller was immersed, rapid-cooled, and quenched in oil at 80° C. After quenching, the workpiece of the roller was tempered for one hour at 200° C. Then, the polishing was performed, and the barrel polishing was performed for two hours. As a result, the roller 2 of Comparative Example 1 was obtained. In a range of 0.1 mm from the surface of the roller 2 of Comparative Example 1, 1.1 mass % to 1.6 mass % of carbon and 0.1 mass % to 0.6 mass % of nitrogen were contained. SAE1075 steel plate was annularly punched out and forged to produce a workpiece of the first washer of Comparative Example 1 and a workpiece of the second washer of Comparative Example 1. The workpiece of the first washer of Comparative Example 1 and the workpiece of the second washer of Comparative Example 1 were held for 0.5 hours at a temperature of 760° C. to 830° C. and were immersed, rapid-cooled, and quenched in oil at 80° C. After quenching, the workpieces were tempered for one hour at 200° C. Then, the polishing was performed, and the barrel polishing was performed for five hours. As a result, the first washer 3 of Comparative Example 1 and the second washer 4 of Comparative Example 1 were obtained. SPCD steel plate was punched out annularly to remove a portion that was to be a pocket. Thereby, the cage 5 was obtained. The thrust roller bearing 1 was manufactured by combining the roller 2 of Comparative Example 1, the first washer 3 of Comparative Example 1, the second washer 4 of Comparative Example 1, and the cage 5. As a result, the thrust roller bearing 1 of Comparative Example 1 was obtained.

The thrust roller bearing 1 according to Comparative Example 2 was manufactured as follows. A bar line of JIS SUJ2 was cut to obtain a workpiece of the roller of Comparative Example 2. The workpiece of the roller of Comparative Example 2 was carbonitrided by being held for one hour at a temperature of 820° C. to 870° C. in an atmosphere with a carbon potential of 1.2 to 1.6 and an ammonia concentration of 0.1 vol % to 0.5 vol %. Then, the workpiece of the roller was immersed, rapid-cooled, and quenched in oil at 80° C. After quenching, the workpiece of the roller was tempered for one hour at 200° C. Then, the shot peening was performed, the polishing was performed, and the barrel polishing was performed for two hours. As a result, the roller 2 of Comparative Example 2 was obtained. In a range of 0.1 mm from the surface of the roller 2 of Comparative Example 2, 1.1 mass % to 1.6 mass % of carbon and 0.1 mass % to 0.6 mass % of nitrogen were contained. The shot peening conditions were as follows.

Shot particle diameter: 100 μm or smaller
Shot particle material: Iron
Shot pressure: 0.5 MPa SAE1075 steel plate was annularly punched out and forged to produce a workpiece of the first washer of Comparative Example 2 and a workpiece of the second washer of Comparative Example 2. The workpiece of the first washer of Comparative Example 2 and the workpiece of the second washer of Comparative Example 2 were held for 0.5 hours at a temperature of 760° C. to 830° C. and were immersed, rapid-cooled, and quenched in oil at 80° C. After quenching, the workpieces were tempered for one hour at 200° C. Then, the shot peening was performed, the polishing was performed, and the barrel polishing was performed for five hours. As a result, the first washer 3 of Comparative Example 2 and the second washer 4 of Comparative Example 2 were obtained. The shot peening conditions were as follows.

Shot particle diameter: 100 μm or smaller
Shot particle material: Iron
Shot pressure: 0.5 MPa SPCD steel plate was punched out annularly to remove a portion that was to be a pocket. Thereby, the cage 5 was obtained. The thrust roller bearing 1 was manufactured by combining the roller 2 of Comparative Example 2, the first washer 3 of Comparative Example 2, the second washer 4 of Comparative Example 2, and the cage 5. As a result, the thrust roller bearing 1 of Comparative Example 2 was obtained.

As shown in Table 1, Comparative Example 1 is the same as Example except that the shot peening was not performed on the washers 3, 4, and Comparative Example 2 is the same as Example except that the shot peening was performed on the roller 2.

in Conventional Example, whereas it is 0.01 to 0.08 in Example and Comparative Examples 1, 2 in which the surface roughness is improved. As described above, in Example according to the present disclosure (and in Comparative Examples 1, 2), both Rvk and Rk of the surface of the roller 2 are small and the surface roughness is also small as compared with Conventional Example.

Figure 5A:
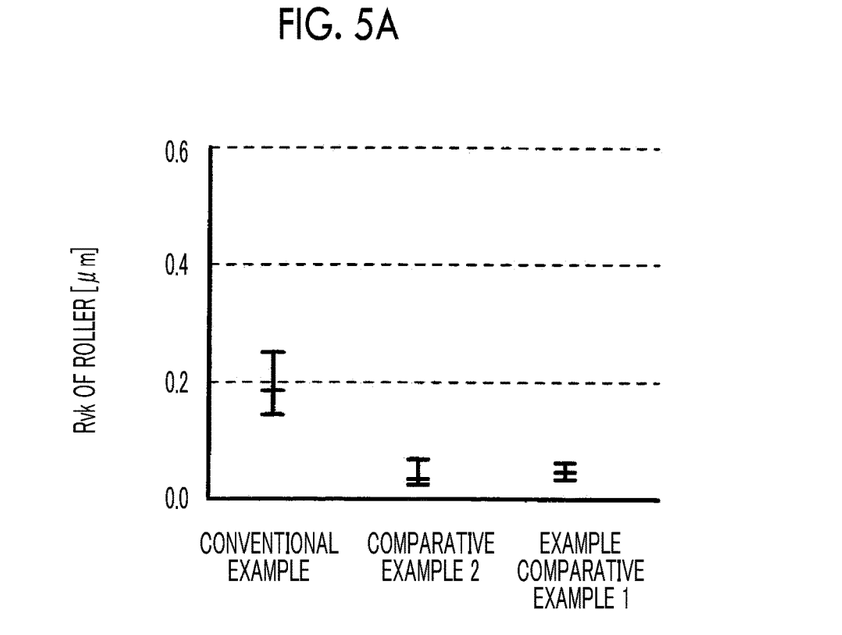
FIG. 5A is a graph showing Rvk of a roller in Example of the present disclosure, Conventional Example, and Comparative Examples.
Figure 5B:
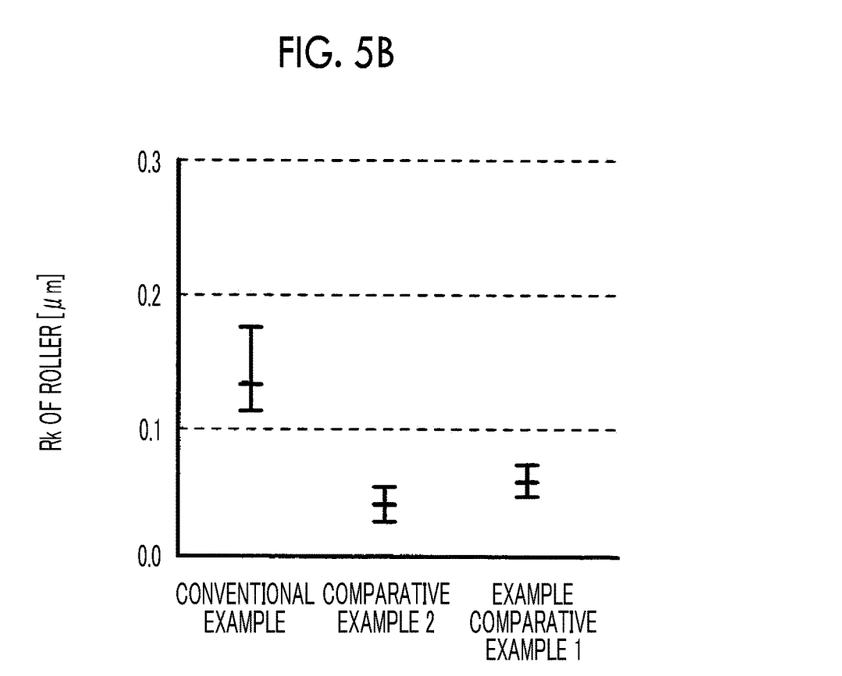
FIG. 5B is a graph showing Rk of the roller in Example of the present disclosure, Conventional Example, and Comparative Examples.
Figure 5C:
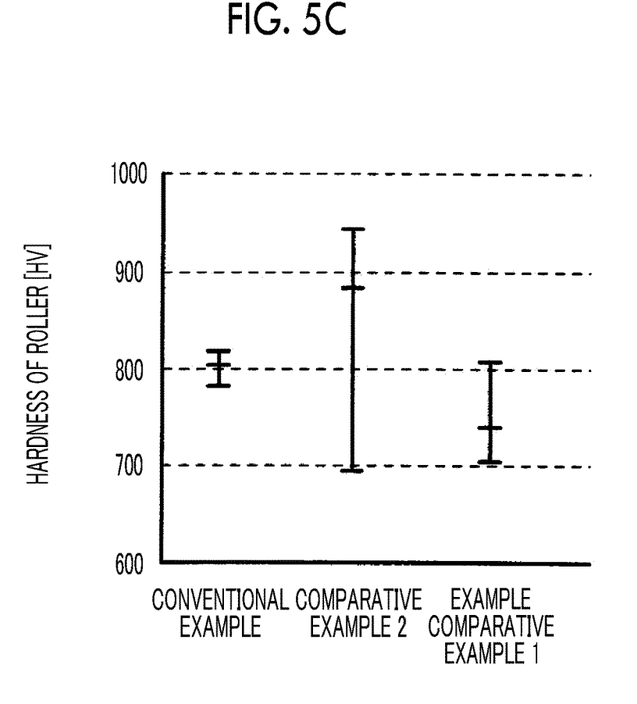
FIG. 5C is a graph showing a hardness of the roller in Example of the present disclosure, Conventional Example, and Comparative Examples.
Figure 5D:
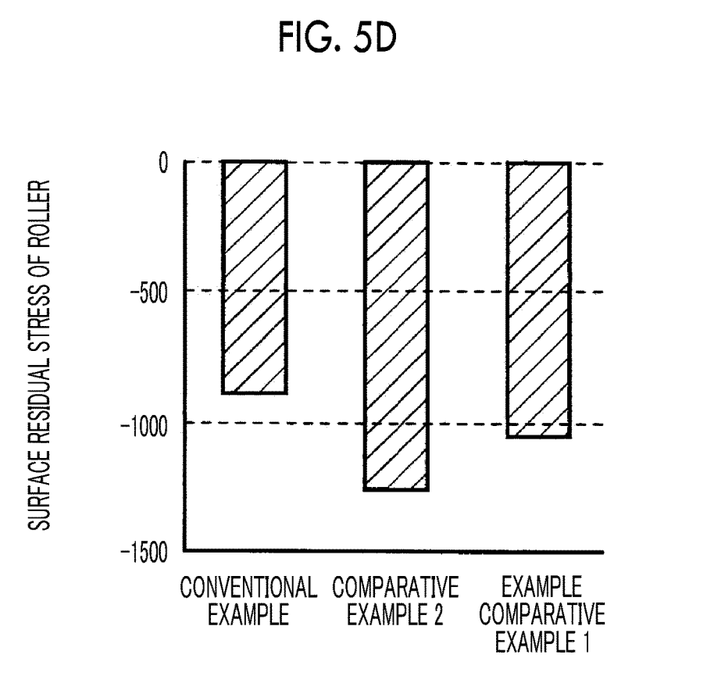
FIG. 5D is a graph showing a surface residual stress of the roller in Example of the present disclosure, Conventional Example, and Comparative Examples.

Further, as shown in FIG. 5C, there is a sample in which the Vickers hardness of the surface of the roller 2 is greater than 850 in Comparative Example 2 in which the shot peening is performed. On the other hand, the Vickers hardness of the surface of the roller 2 is 700 to 850 in Example (and Comparative Example 1) in which the shot peening is not performed. Further, as shown in FIG. 5D, the surface compressive residual stress of the roller 2 is −900 MPa in Conventional Example. On the other hand, the surface compressive residual stress of the roller 2 is smaller than −1200 in Comparative Example 2, and is −1200 MPa or larger and smaller than −900 MPa in Example (and Comparative Example 1). That is, in Example according to the present disclosure (and Comparative Example 1), the surface compressive residual stress has an intermediate value between Conventional Example and Comparative Example 2.

Figure 6A:
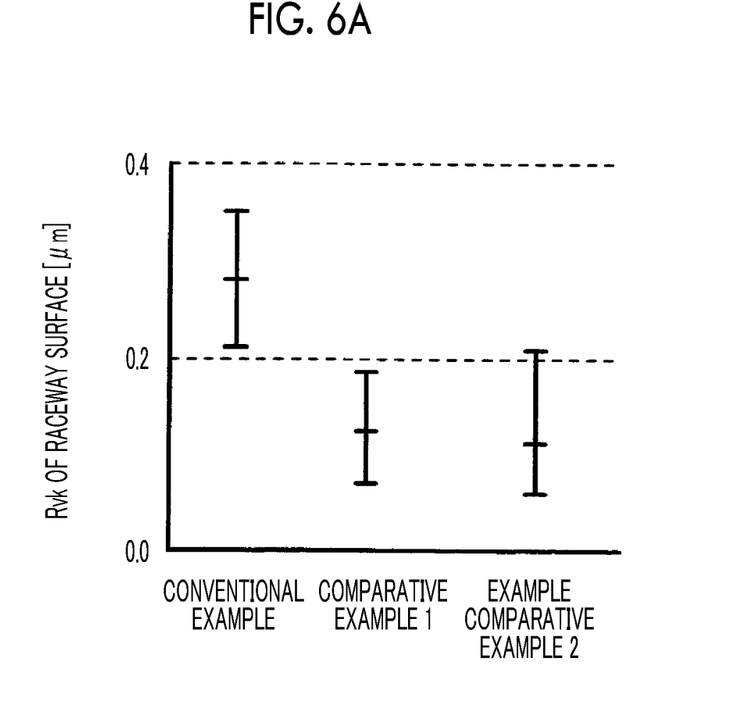
FIG. 6A is a graph showing Rvk of raceway surfaces in Example of the present disclosure, Conventional Example, and Comparative Examples.
Figure 6B:
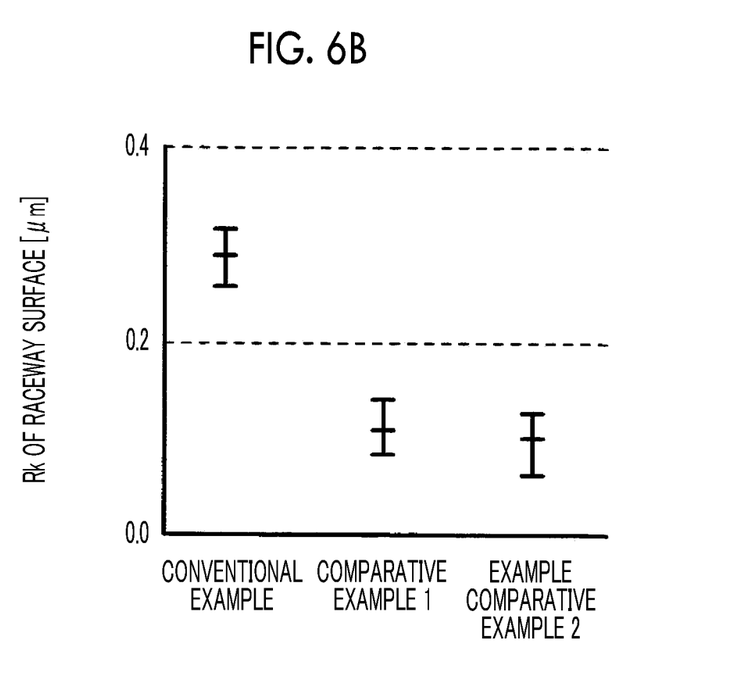
FIG. 6B is a graph showing Rk of the raceway surfaces in Example of the present disclosure, Conventional Example, and Comparative Examples.

Further, as shown in FIG. 6A, Rvk of the surfaces of the raceway surfaces 3a, 4a is larger than 0.22 in Conventional Example, whereas it is 0.05 to 0.22 in Example and Comparative Examples 1, 2 in which the surface roughnesses are improved. Further, as shown in FIG. 6B, Rk of the surfaces of the raceway surfaces 3a, 4a is 0.2 or larger in Conventional Example, whereas it is 0.05 to 0.15 in Example. As described above, in Example according to the present disclosure (and Comparative Examples 1, 2), both Rvk and Rk of the surfaces of the raceway surfaces 3a, 4a are small and the surface roughnesses are also small as compared with Conventional Example.

Figure 6C:
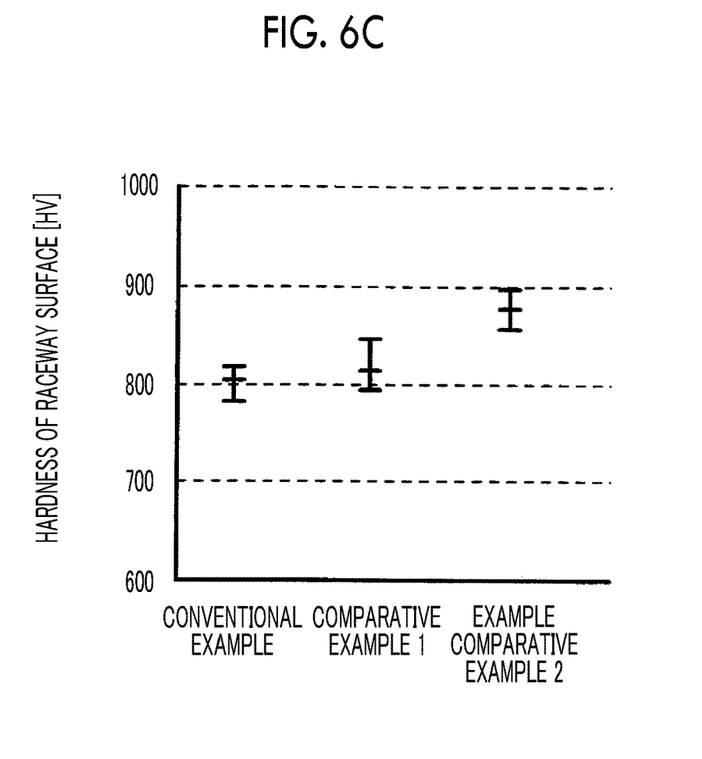
FIG. 6C is a graph showing hardnesses of the raceway surfaces in Example of the present disclosure, Conventional Example, and Comparative Examples.

Further, as shown in FIG. 6C, the Vickers hardnesses of the surfaces of the raceway surfaces 3a, 4a are smaller than

TABLE 1

|  |  | Conventional Example | Comparative Example 1 | Comparative Example 2 | Example |
|---|---|---|---|---|---|
| Roller | Material | Ordinary bearing steel | High-carbon chromium bearing steel | | |
|  | Roughness improvement | x | ○ | ○ | ○ |
|  | Shot peening | x | x | ○ | x |
| Raceway surface | Material |  | Carbon steel | | |
|  | Roughness improvement | x | ○ | ○ | ○ |
|  | Shot peening | x | x | ○ | ○ |

Figure 6D:
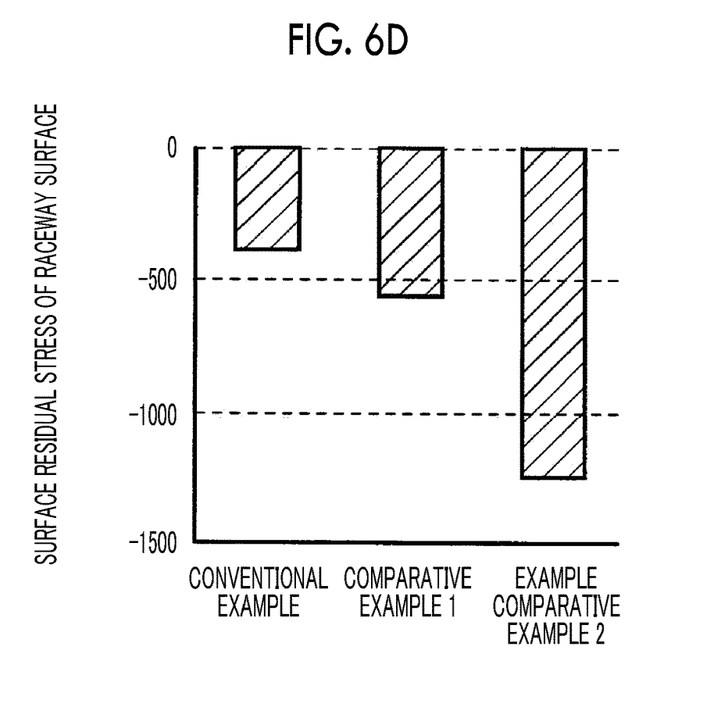
FIG. 6D is a graph showing surface residual stresses of the raceway surfaces in Example of the present disclosure, Conventional Example, and Comparative Examples.

With respect to Example, Conventional Example, and Comparative Examples 1, 2, FIG. 5A shows Rvk and FIG. 5B shows Rk of the surface of the roller 2, FIG. 5C shows the Vickers hardness of the surface of the roller 2, and FIG. 5D shows a surface residual stress of the roller 2, respectively. Further, with respect to Example, Conventional Example, and Comparative Examples 1, 2, FIG. 6A shows Rvk and FIG. 6B shows Rk of the surfaces of the raceway surfaces 3a, 4a of the washers 3, 4, FIG. 6C shows the Vickers hardnesses of the raceway surfaces 3a, 4a, and FIG. 6D shows the surface residual stresses of the raceway surfaces 3a, 4a, respectively.

As shown in FIG. 5A, Rvk of the surface of the roller 2 is larger than 0.1 in Conventional Example, whereas it is 0.01 to 0.10 in Example and Comparative Examples 1, 2 in which the surface roughness is improved. Further, as shown in FIG. 5B, Rk of the surface of the roller 2 is larger than 0.1

850 in Conventional Example and Comparative Example 1 in which the shot peening is not performed. On the other hand, the Vickers hardnesses of the surfaces of the raceway surfaces 3a, 4a are 850 to 900 in Example and Comparative Example 2 in which the shot peening is performed. Further, as shown in FIG. 6D, the surface compressive residual stresses of the raceway surfaces 3a, 4a are −600 MPa or larger in Conventional Example and Comparative Example 1 in which the shot peening is not performed, whereas they are −1400 MPa to −1000 MPa in Example (and Comparative Example 2). That is, in Example according to the present disclosure (and Comparative Example 2), the surfaces of the raceway surfaces 3a, 4a are hard and the absolute values of the surface compressive residual stresses are large as compared with Conventional Example and Comparative Example 1.

Figure 7:
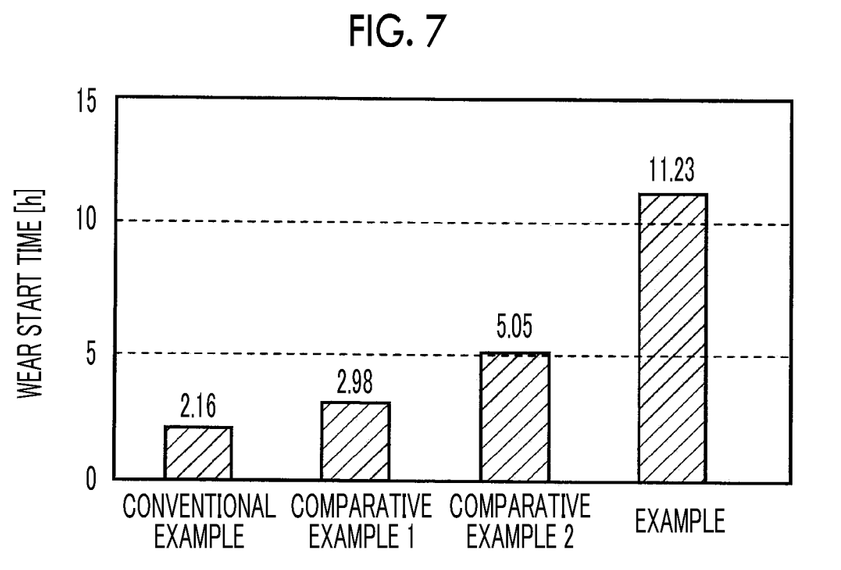
FIG. 7 is a graph showing the wear start time in Example of the present disclosure, Conventional Example, and Comparative Examples.

FIG. 7 shows measurement results of the wear start time of Example, Conventional Example, and Comparative Examples 1, 2. The measurement results in FIG. 7 represents an average value of three times of tests. It can be considered that, as shown in FIG. 7, in Comparative Example 1, by improving the surface roughness of the roller 2, the wear start time is slightly longer than in Conventional Example. However, the wear is increased because the hardnesses of the raceway surfaces 3a, 4a are insufficient. It can be considered that, in Comparative Example 2, by performing the shot peening on the roller 2, the raceway surfaces 3a, 4a are relatively easily worn, such that a sufficient wear start time does not be obtained. On the other hand, in Example according to the present disclosure, the wear start time is five times or more as compared with Conventional Example. As a result, it is understood that the wear resistance in the poor lubrication environment is significantly improved.

Action and Effect of Embodiment

As described above, in the thrust roller bearing 1 according to the present embodiment, the roller 2 is made of high-carbon chromium bearing steel and has the surface roughness of 0.01 to 0.10 in terms of Rvk and 0.01 to 0.08 in terms of Rk. At least one of the washers 3, 4 is made of carbon steel, the surface compressive residual stresses of the raceway surfaces 3a, 4a are −1400 MPa to −1000 MPa, and the Vickers hardnesses of the surfaces of the raceway surfaces 3a, 4a are 850 to 900.

By reducing the surface roughness of the roller 2, the lubricating oil 6 easily circulates between the first and second raceway surfaces 3a, 4a by the rotation of the roller 2, and the wear resistance can be improved even in the poor lubrication environment. Further, by increasing the hardnesses of the surfaces of the raceway surfaces 3a, 4a by the shot peening, the wear can be suppressed even in a state where the lubricating oil 6 is very small, and the wear resistance can be further improved.

ADDITIONAL REMARK

Although the present disclosure is described above based on the embodiment, the embodiment does not limit the disclosure according to the claims. It should be noted that not all combinations of the features described in the embodiment are essential to the means for solving the problems of the present disclosure.

Further, the present disclosure can be appropriately modified and implemented without departing from the spirit of the present disclosure. For example, in the embodiment, a case where the rollers 2 are arranged in one row in a circumferential direction is described, but the arrangement of the rollers 2 is not limited to this, and for example, the rollers 2 may be arranged in two or more rows.

What is claimed is:

1. A thrust roller bearing comprising:
   a plurality of rollers; and
   a pair of annular washers having raceway surfaces on which the rollers roll, the raceway surfaces being arranged to face each other, wherein:
   the roller is made of high-carbon chromium bearing steel and has a surface roughness of 0.01 to 0.10 in terms of Rvk and 0.01 to 0.08 in terms of Rk; and
   at least one of the washers is made of carbon steel, an absolute value of a surface compressive residual stress of the raceway surface is 1000 MPa to 1400 MPa, and Vickers hardness of the raceway surface is 850 to 900.

2. The thrust roller bearing according to claim 1, wherein:
   the washers include a first washer that is provided on a rotating member and rotates with a rotation of the rotating member and a second washer that is provided on a non-rotating member and does not rotate with the rotation of the rotating member; and
   the first washer is made of carbon steel, the absolute value of the surface compressive residual stress of the raceway surface is 1000 MPa to 1400 MPa, and the Vickers hardness of the raceway surface is 850 to 900.

3. The thrust roller bearing according to claim 2, wherein in the first washer, a surface roughness of the raceway surface is 0.05 to 0.22 in terms of Rvk and 0.05 to 0.15 in terms of Rk.

4. The thrust roller bearing according to claim 1, wherein both of the washers are made of carbon steel, the absolute values of the surface compressive residual stresses are 1000 MPa to 1400 MPa, and Vickers hardnesses of the raceway surfaces are 850 to 900.

5. The thrust roller bearing according to claim 1, wherein the roller contains 0.1 mass % to 0.6 mass % of carbon and 1.1 mass % to 1.6 mass % of nitrogen in a range of 0.1 mm from a surface, and has an absolute value of a surface compressive residual stress of between 900 MPa and 1200 MPa.

* * * * *